Jan. 30, 1968  B. MARKOW  3,366,791
GEIGER-MULLER RADIATION DETECTOR WITH MEANS
TO PREVENT ERRONEOUS READINGS
AT HIGH RADIATION INTENSITY
Filed May 13, 1965
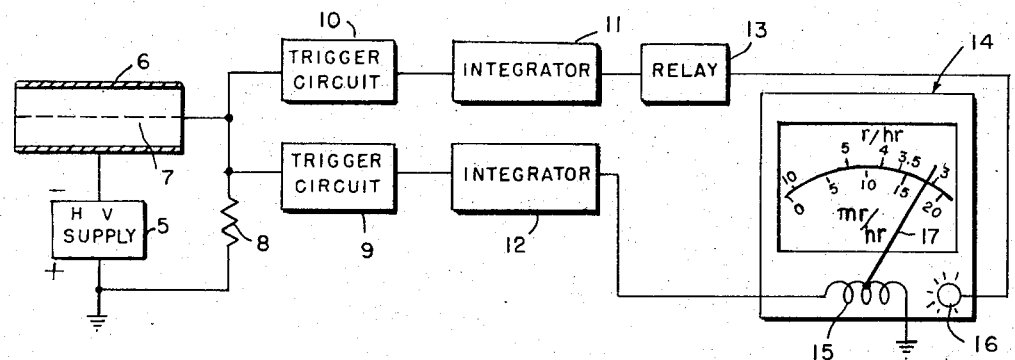
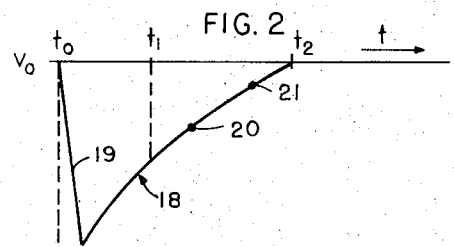
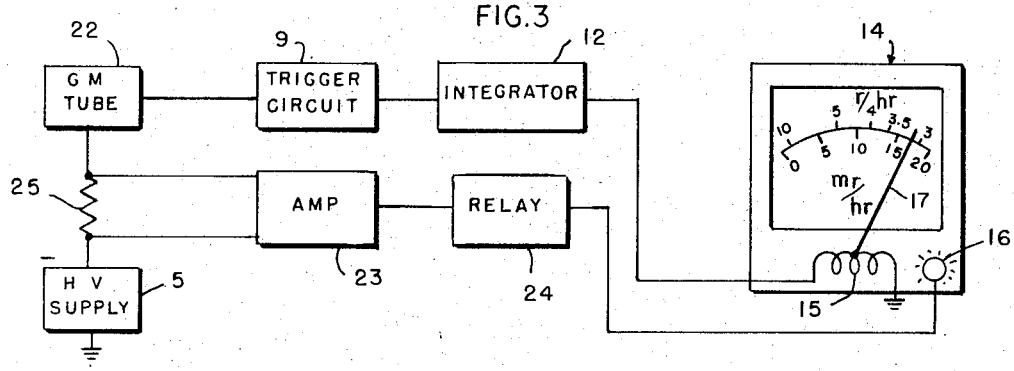
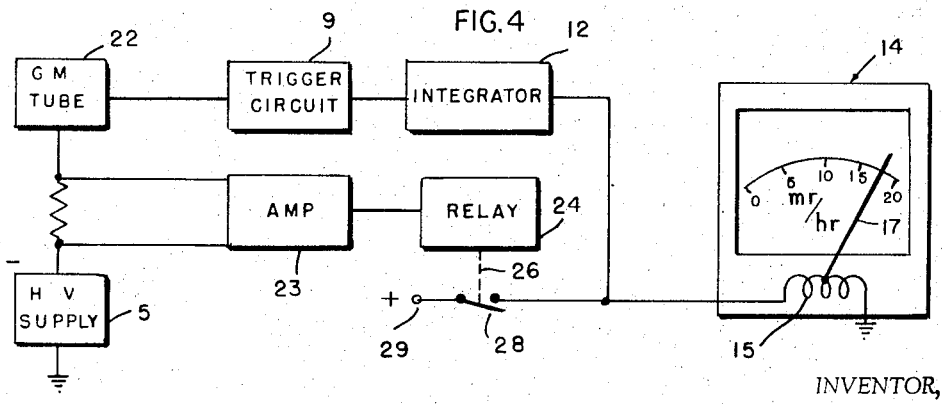
INVENTOR,
BASIL MARKOW
BY: Harry M. Saragovitz,
Edward J. Kelly,
Herbert Berl &
Julian C. Keppeler ATTORNEYS.

United States Patent Office 3,366,791
Patented Jan. 30, 1968

3,366,791
GEIGER-MULLER RADIATION DETECTOR WITH MEANS TO PREVENT ERRONEOUS READINGS AT HIGH RADIATION INTENSITY
Basil Markow, Bradley Beach, N.J., assignor to the United States of America as represented by the Secretary of the Army
Filed May 13, 1965, Ser. No. 455,659
8 Claims. (Cl. 250—83.6)

ABSTRACT OF THE DISCLOSURE

Several means are shown by which a radiation detector, calibrated for low to moderate intensity, may be prevented from giving erroneous readings at high radiation intensity where the average spacing between counts is comparable to or less than the dead time of the counter tube and where the counter tube pulse output rapidly decreases. In two embodiments, an alarm is actuated when the radiation reaches a sufficiently high level and a reverse-reading scale is read. In the third embodiment, the microammeter is prevented from coming back on scale at high levels of radiation.

---

The invention described herein may be manufactured and used by or for the Government for governmental purposes without the payment of any royalty thereon.

The present invention relates to a Geiger-Müller type radiation measuring device or survey meter and more particularly to an improved device of this type which will not give erroneous readings at values of incident radiation flux greatly in excess of the full scale reading of the device. Presently available survey meters of this type include a Geiger-Müller counter tube, a trigger circuit, an integrator and a microammeter. Alpha, beta and gamma radiation entering the counter tube ionizes the gas therein, causing a pluse of current in a circuit connected to the tube. The counter tube pulses are applied to the trigger circuit, which may be a one-shot or monostable multivibrator. The trigger circuit produces a pulse of constant area or constant charge each time it is triggered and the trigger circuit output is integrated and applied to the microammeter which is calibrated in counts per minute (c.p.m.) or milliroentgens per hour (mr./hr.). Thus a DC current proportional to the counting rate of the tube is applied to the microammeter. These survey meters are usually provided with several ranges which are chosen by changing the pulse width of the trigger circuit output. Typical commercially available portable survey meters of the type intended for radioactive ore prospecting and fallout measurements may include three full scale ranges of .2, 2 and 20 mr./hr., corresponding approximately to 600; 6,000 and 60,000 counts or ionizing events per minute. These instruments are accurate and find widespread use for indicating the low to moderate amounts of radiation for which they are designed. However, due to the inherent characteristics of Geiger-Müller tubes, as the radiation intensity increases beyond the capacity of the instrument, the microammeter first goes off scale and then with further increases in incident radiation, comes back on scale and gradually goes to zero at some extremely high value of incident radiation. Thus these survey meters can give deceptively low or zero indications when the radiation is actually dangerously high. The present invention provides a means for warning the operators of such instruments when this condition occurs. In another aspect of the invention, an additional backward reading scale is provided on the microammeter for indicating these high values of radiation.

Briefly stated, the invention provides, in a survey meter of the type described, a means for detecting incident radiation in excess of the normal capacity of the meter or incident radiation equal to or greater than that required to place the microammeter off scale. The output of this excess radiation detecting means may be arranged to operate an alarm which may be a light or buzzer which would advise the operator that any on-scale or zero indications while the alarm is on are erroneous. In addition, a reverse scale may be provided on the microammeter to indicate these high values of radiation. This scale would be read when the alarm is on. In another embodiment, instead of operating an alarm, the excessive radiation detection means operates a circuit, for example a relay, which applies a bias current to the microammeter to keep it off scale while the excessive radiation persists. Thus the invention provides an added safety feature and extends the survey meter range with only a moderate amount of additional circuitry.

It is therefore an object of this invention to prevent erroneous indications on Geiger-Müller type radiation measuring devices.

It is a further object of the invention to extend the range of presently known types of survey meters of the type described.

Another object of the invention is to prevent erroneous indications on survey meters when the incident radiation is at very high levels.

These and other objects of the invention will become apparent from the following detailed description and drawings, in which:

FIG. 1 is a circuit diagram of one illustrative embodiment of the invention.

FIG. 2 is a graph illustrating an output pulse of a typical Geiger-Müller tube, and FIGS. 3 and 4 are modifications of the circuit of FIG. 1.

Referring to FIG. 1, there is shown therein a portable radiation survey meter comprising a Geiger-Müller counter tube 6 and 7. The cylinder 6 is the tube cathode and the wire 7, mounted axially of the cathode, is the tube anode. The negative terminal of high voltage supply 5 is connected to cathode 6 and the grounded, positive terminal thereof is connected through load resistor 8 to the anode 7. The output of the Geiger-Müller tube is taken from the anode thereof and applied in parallel to the inputs of two trigger circuits 9 and 10. The output of trigger circuit 9 is integrated in integrator 12 and then applied to the coil or movement 15 of microammeter 14. The output of the second trigger circuit 10 is applied to integrator 11 which in turn operates relay 13 which controls the alarm or light 16 mounted near the dial of the microammeter. The microammeter dial contains a linear, upreading scale of 0–20 milliroentgens per hour (mr./hr.) and a reversed, non-linear, logarithmic scale of 3–10 roentgens per hour (r./hr.). Presently known survey meters include the counter tube 6 and 7, high voltage supply 5, trigger circuit 9, integrator 12 and microammeter 14 but with no reversed, non-linear scale thereon. The 0–20 mr./hr. linear scale in these known survey meters may be used to indicate a plurality of ranges, for example .2, 2 and 20 mr./hr.

FIG. 2 shows a single pulse 18 obtained from a Geiger-Müller counter tube after it has been ionized by an isolated ionizing event. Such a negative pulse would appear between anode 7 and ground in FIG. 1. At time $t_0$ the tube starts to ionize and the tube current rapidly rises to produce the sharp leading edge 19 of the negative pulse 18 which appears across resistor 8. The ionization rapidly builds up by the mechanism of the Townsend avalanche formation. After reaching a peak current, the tube starts to slowly de-ionize due to the presence of a self-quenching agent which forms part of the tube atmosphere. The exponentially rising portion of the curve 18 represents the gradual decrease in tube current as it de-ionizes. The exact mode of operation of these tubes is highly complex and is discussed in detail in an article entitled "Geiger Counter Tubes" by Friedman in the July 1949 (vol. 37) issue of the "Proceedings of the IRE," pp. 791–808. However in order to understand the present invention it is sufficient to appreciate that following an ionizing event, a counter tube will be completely insensitive to further incident radiation for a time dependent on the applied voltage and tube dimensions. This period is known as the dead time and is represented by the interval $t_0$–$t_1$ in FIG. 2. Further, following the dead time is a recovery time, $t_1$–$t_2$, during which the tube will produce an output, but the output pulses will be of reduced amplitude since the tube has not fully de-ionized. Further, the size of pulses produced during the recovery time depends on the elapsed time since the initial ionizing event. An ionizing event occurring at point 20 will produce a smaller pulse than one produced at point 21. The dead time of a typical counter tube may be of the order of .2 millisecond (ms.) with an approximately equal recovery time. Thus, if the incident radiation averages 60,000 events or counts per minute (c.p.m.), the average time between events is one millisecond. However, since radiation is always randomly spaced in time, there are a statistically predictable number of counts which will occur with a time spacing of less than the counter tube dead time. The second of such events is missed since it enters the counter tube during its dead time. Also, ionizing events occurring during the recovery time may produce counter tube output pulses too small to operate the trigger circuit and these will also be lost. In presently known types of survey meters the calibration of the higher ranges is compensated for these missed counts. For example, if it is determined that at an average counting rate of 60,000 c.p.m. that 10% of the counts are lost the output pulse width of the trigger circuit would be adjusted so that 54,000 pulses per minute output therefrom will deflect the microammeter full scale to give a reading of 60,000 c.p.m. or 20 mr./hr. In such a survey meter, as the radiation intensity increases to moderately high values, the meter goes off scale and the precentage of missed counts increases. For example, at an average intensity of 600,000 c.p.m., the average spacing between ionizing events or counts is only .1 ms., which is less than the dead time of the typical counter tube. In such a case the majority of the counts would be missed or would produce too small a pulse to actuate the trigger circuit. If 90% of the counts were lost at this radiation intensity, the trigger circuit would produce 60,000 pulses per minute. This pulse rate from the trigger circuit would put the microammeter off scale, since 54,000 c.p.m. represents full scale. At still higher radiation intensity, the proportion of small counter tube output pulses produced during the tube recovery time relative to full sized pulses capable of operating the trigger circuit rapidly increases. This causes the output of the trigger circuit to decrease with increasing radiation intensity and brings the microammeter back on scale to indicate a deceptively low reading. For example, at 6,000,000 c.p.m. incident radiation, 99.5% of the counts may be missed, in which case the trigger circuit output would be 30,000 c.p.m., which would give approximately a half scale reading. At still higher intensities, the Geiger-Müller tube will produce a steady stream of reduced amplitude pulses which are too small to operate the trigger circuit and the resulting indication on the microammeter will be zero.

The operation of FIG. 1 is as follows, in the region of low to moderate radiation intensities, the trigger circuit 9, integrator 12 and microammeter 14 function in the known manner to indicate radiation on the lower, linear 0–20 scale of the microammeter. The trigger circuit 10 is triggered simultaneously with trigger circuit 9. The output of trigger circuit 10 is integrated by 11, the output of which holds relay 13 operated. If relay 13 is operated or energized, it holds the alarm lamp or buzzer 16 off. The trigger circuit 10 is arranged, by adjusting the bias thereof, to be less sensitive than the first trigger circuit 9, that is the circuit 10 requires larger pulses from the counter tube to trigger than does the trigger circuit 9. This differential sensitivity between circuits 9 and 10 is such that, as the incident radiation rises to values which place the needle 17 of the microammeter off scale, the resulting reduced amplitude pulses from the counter tube will be too small to operate circuit 10, but most of these pulses will continue to trigger circuit 9. When circuit 10 stops operating, the relay 13 becomes de-energized and the alarm 16 goes on and remains on at any higher value of incident radiation, thus warning the operator of the high values of radiation. The microammeter 14 may be provided with an additional backward-reading or reverse scale, which is used when the needle 17 comes back on scale with the alarm 16 on. It has been found empirically that this reverse scale is approximately logarithmic. The reverse scale shown in FIG. 1 is calibrated to read from 3 to 10 roentgens per hour. Thus, in addition to the safety feature of the alarm, the instrument can be calibrated to extend its useful range by several orders of magnitude. It should be noted that a certain amount of radiation is necessary to hold the alarm 16 off. The circuit is arranged so that the ever-present natural background radiation triggers circuit 10 sufficiently often to hold the relay 13 energized.

FIG. 3 shows a modification of the circuit of FIG. 1 which accomplishes the same results with different circuitry. In this figure the elements having the same reference characters perform the same function as do the similarly numbered elements of FIG. 1. The Geiger-Müller tube 11, trigger circuit 9, integrator 12, the high voltage supply 5 and microammeter 14 comprise a known type of survey meter. In addition to these elements, a small voltage dropping resistor 25 is placed in the lead which supplies the high voltage to the counter tube anode. The amplifier 23 amplifies the voltage developed across resistor 25. The output of amplifier 23 is applied to relay 24. Relay 24 is connected to and operates alarm 16. At low and moderate levels of incident radiation, the current supplied by high voltage supply 5 to the counter will be too small to energize relay 24, however, as the incident radiation increases, the current required by the counter tube correspondingly increases. This circuit is arranged so that when the incident radiation is at the moderately high levels at which the microammeter is off scale on its highest linear range, the voltage across resistor 25 is high enough to operate or energize the relay 24, after amplification by amplifier 23. The alarm 16 serves the same purpose as that of FIG. 1.

In the modification of FIG. 4, the amplifier 23 and relay 24 function the same as the similar elements of FIG. 3. In this embodiment, the relay is arranged to close a pair of contacts 28 and thereby apply a fixed bias current to the microammeter coil 15 from voltage source 29 when the incident radiation exceeds the moderate amount for which the survey meter is designed to measure. This bias current overrides the output of the integrator 12 to keep the needle 17 off scale so long as the radiation exceeds the amount at which the relay 24 operates. This prevents the needle from coming back on scale to give erroneous readings. No reverse microammeter scale is required in this embodiment.

While the invention has been described in connection with illustrative embodiments thereof, many variations thereof are possible without departing from the inventive concepts disclosed herein. For example, suitable transistor circuits may be substituted for the relays shown in the drawing. Accordingly, the invention should be limited only by the scope of the appended claims.

What is claimed is:

1. A survey meter of the type described comprising, a Geiger-Müller counter tube, an ammeter, said ammeter being connected to said counter and arranged to linearly indicate low to moderate radiation intensities incident on said counter tube, an excess radiation detection means connected to said counter tube to detect incident radiation of such intensity that the average spacing between counts thereof is comparable to or less than the dead time of said counter tube, and means responsive to said excess radiation detector for preventing erroneous indications on said ammeter in the presence of such excess radiation.

2. The survey meter of claim 1, in which said last-named means comprises an alarm arranged to be operated by output from said excess radiation detector.

3. The survey meter of claim 1 in which said last-named means comprises a means to apply a fixed bias current to said ammeter in response to an output from said excess radiation detector.

4. In a survey meter of the type described, a Geiger-Müller counter tube, a high voltage supply connected to said counter tube, a trigger circuit connected to the output of said counter tube, said trigger circuit producing a pulse of constant charge for each pulse produced by said counter tube exceeding a first given amplitude, means to integrate the pulse output of said trigger circuit, and means to apply the integrated output thereof to a microammeter, said microammeter comprising at least one linear upreading range and a reversed, downreading, non-linear range, means connected to said counter tube to detect radiation of intensity greater than the maximum reading of the highest of said upreading linear ranges, and an alarm arranged to be operated by output from said last-named means.

5. The survey meter of claim 4 in which said last-named means comprises a second trigger circuit connected to said counter tube, said second trigger circuit producing a pulse for each pulse produced by said counter tube exceeding a second given amplitude, said second given amplitude being greater than said first given amplitude, and means responsive to pulse output from said second trigger circuit to hold said alarm in the non-operated or off condition.

6. The survey meter of claim 4 in which said last-named means comprises a means for measuring the amount of current supplied to said counter tube from said high voltage supply.

7. A survey meter of the type described comprising a Geiger-Müller counter tube, a high voltage supply connected to said counter tube, a trigger circuit connected to the output of said counter tube, means to integrate the output of said trigger circuit and means to apply the integrated output of said trigger circuit to a microammeter calibrated to indicate the average rate of incidence of radiation at said counter tube, a voltage dropping resistor in the connection between said high voltage supply and said counter tube, an amplifier with its input connected to said resistor and its output connected to a relay, said relay including a pair of normally open contacts connecting a source of bias current to said microammeter, said relay being arranged to operate and close said normally open contacts when the incident radiation reaches such a level that the microammeter is off scale, said bias current being arranged to hold said microammeter off scale while such radiation level persists.

8. A survey meter of the type described comprising a Geiger-Müller counter tube, a high voltage supply connected to said counter tube via a voltage dropping resistor, a trigger circuit connected to the output of said counter tube, means to integrate the output of said trigger circuit and means to apply such integrated output to a microammeter calibrated with at least one linear, upreading scale and a reverse reading, non-linear scale, means connected to said voltage dropping resistor to operate a relay when the voltage across said resistor reaches a predetermined value at which said microammeter is off scale, and means connected to said relay to operate an alarm in response to said predetermined value of voltage across said resistor.

References Cited

UNITED STATES PATENTS

| | | | |
|---|---|---|---|
| 2,643,344 | 6/1953 | McLareu et al. | 250—83.6 |
| 2,672,561 | 3/1954 | Lichtman | 250—83.6 |
| 3,227,947 | 1/1966 | Muller | 324—33 |
| 3,303,343 | 2/1967 | Glass | 250—83.6 X |

RALPH G. NILSON, *Primary Examiner.*

ARCHIE R. BORCHELT, *Examiner.*

A. B. CROFT, *Assistant Examiner.*